(12) United States Patent
Nogi

(10) Patent No.: US 6,474,874 B1
(45) Date of Patent: Nov. 5, 2002

(54) CAGE FOR DOUBLE ROW ROLLER BEARING

(75) Inventor: Takashi Nogi, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/743,767

(22) PCT Filed: Apr. 25, 2000

(86) PCT No.: PCT/JP00/02702

§ 371 (c)(1),
(2), (4) Date: Jan. 16, 2001

(87) PCT Pub. No.: WO00/70235

PCT Pub. Date: Nov. 23, 2000

Related U.S. Application Data

(63) Continuation-in-part of application No. 09/582,472, filed on Jun. 27, 2000.

(30) Foreign Application Priority Data

May 13, 1998 (JP) .............................................. 11-132526
Oct. 29, 1999 (WO) .................................. PCT/JP99/06050

(51) Int. Cl.[7] ............................................... F16C 33/46
(52) U.S. Cl. ....................................................... 384/572
(58) Field of Search ............................... 384/572, 575, 384/576, 577, 580

(56) References Cited

U.S. PATENT DOCUMENTS

| | | | |
|---|---|---|---|
| 2,044,663 A | 6/1936 | Brodin | 308/217 |
| 3,253,869 A | 5/1966 | Smith | 308/212 |
| 4,621,932 A | 11/1986 | Küfner et al. | 384/569 |
| 4,881,830 A | 11/1989 | Shepard et al. | |
| 5,062,719 A | 11/1991 | Bauer et al. | 384/450 |
| 5,178,474 A | 1/1993 | Müntnich et al. | 384/577 |
| 5,547,432 A | 8/1996 | Imanishi et al. | |
| 5,649,769 A * | 7/1997 | Agari et al. | 384/45 |

FOREIGN PATENT DOCUMENTS

| | | |
|---|---|---|
| DE | 24 54 442 | 12/1975 |
| DE | 34 32 875 | 3/1986 |
| DE | 37 18 693 A1 | 12/1988 |
| DE | 4001882 C2 | 1/1990 |
| DE | 39 36 451 A1 | 5/1991 |
| FR | 1188894 | 9/1959 |
| JP | 54-95654 | 7/1979 |
| JP | 57-38814 | 8/1982 |
| JP | 2-203019 | 8/1990 |
| JP | 5-87326 | 11/1993 |
| JP | 7-208569 | 8/1995 |
| JP | 9-177794 | 7/1997 |

* cited by examiner

Primary Examiner—Lenard A. Footland
(74) Attorney, Agent, or Firm—Crowell & Moring Ltd.

(57) ABSTRACT

A comb-shaped cage for use in a roller bearing having one circular portion axially opposed to the end surface of each of rollers and a plurality of bar portions protruding from one or both axial sides of the circular portion and arranged circumferentially opposed to the rolling surface of each rollers is disclosed. It is designed so as to satisfy the condition $0.2 \leq (I_1'/I_3') \leq 2.5$, wherein $I_1'$ expresses the moment of inertia of area for the circular portion relative to a neutral axis parallel with the longitudinal direction of the bar portion and $I_3'$ expresses the moment of inertia of area for the bar portion relative to a neutral axis parallel with the circumferential direction of the cage. This enables to improve the strength of the cage without lowering the load capacity of the bearing to which the cage is assembled.

18 Claims, 12 Drawing Sheets

CAGE FOR DOUBLE ROW ROLLER BEARING

CROSS-REFERENCE TO RELATED APPLICATION

This application is a CIP of co-pending U.S. application Ser. No. 09/582,472, filed Jun. 27, 2000.

BACKGROUND OF THE INVENTION

The present invention relates to a roller bearing used in apparatus causing large vibrations such as axles of railway vehicles or vibrating screens, that is, a roller bearing for use in places undergoing vibrations repeatedly at least in the radial direction of the bearing and, more in particular, it relates to a comb-shaped cage assembled in such a roller bearing.

Roller bearings have been used generally for supporting rotational shafts, for example, in vehicles and various industrial machines. A roller bearing comprises, for example, as shown in FIG. 1, an outer ring 1 having an outer ring raceway 1a at the inner circumferential surface, an inner ring 2 having an inner ring raceway 2a at the outer circumferential surface, a plurality of rollers 3 assembled such that they can roll between the outer ring raceway 1a and the inner ring raceway 2a, and a cage 4 interposed rotatably between the outer ring raceway 1a and the inner ring raceway 2a in a state of holding the plurality of the rollers 3.

Each of the plurality of the rollers 3 are arranged in double rows between the outer ring raceway 1a and the inner ring raceway 2a, and the rollers 3 in each row are held by respective comb-shaped cage 4. That is, FIG. 1 illustrates an example having two comb-shaped cages 4.

Each of the comb-shaped cages 4 comprises, as shown in FIG. 1 and FIG. 2, respectively, a circular portion 5 axially opposing to the end surface 3a of the roller 3 and a plurality of bar portions 7 protruding from one axial side of the circular portion 5 and arranged circumferentially being opposed to the rolling surface 3b of the roller 3. A space surrounded by the circular portion 5 and the bar portions 7, 7 is referred to as a pocket 8 for accommodating the roller 3, and the roller 3 is held rotatably in the cage 4 by providing a predetermined gap between the cage 4 and the roller 3.

In the roller bearing having the double rows of rollers 3 as described above, in a case where individual cage 4 is assembled on every row for each of the rollers 3 as shown in FIG. 1, comb-shaped cages of a configuration in which the bar portions 7 protrude only from one axial side of the circular portion 5 as shown in FIG. 2 is used. On the other hand, in a case where the rollers 3 in the double rows are held by one cage, a comb-shaped cage of a configuration in which bar portions 7 protrude respectively from both axial sides of the circular portion 5 as shown in FIG. 3 is used.

In the subsequent description, a comb-shaped cage of a configuration in which bar portions 7 protrude from one axial side of the circular portion 5 as shown in FIG. 2 is sometimes referred to as a two component type, whereas a comb-shaped cage of a configuration in which bar portions 7 protrude from both axial sides of the circular portion 5 as shown in FIG. 3 is sometimes referred to as a one component type.

By the way, when the roller bearing having the cage 4 as described above is used in places causing large vibrations repeatedly such as axles of vehicles, or driving apparatus, iron making rolling mills or vibrating screens, the cage 4 is vibrated repeatedly in the radial direction of the bearing and the bar portion 7 of the cage 4 collides against the rollers 3 again and again. Accordingly, load W' is exerted in the radial direction by the collision from the roller 3 to the bar portion 7 of the cage 4 as shown in FIG. 4 to deform the cage 4 as shown in FIGS. 4(B), (C).

When the bending stress is loaded on the circular portion 5 and the bar portion 7 repeatedly, cracks occur in the circular portion 5 or the bar portion 7 which not only fractures the cage 4 but also sometimes makes the rotation of the bearing impossible during long time use.

Since the cracks occur at a connection portion between the circular portion 5 and the bar portions 7, it is necessary for preventing fracture of the cage 4 thereby preventing deterioration for the bearing life, to moderate the bending stress caused to the connection portion by the load W' in the radial direction.

Further, when the roller bearing having the cages 4 as described above is used in places where abrupt acceleration/deceleration or load fluctuations are repeated, since revolutional speed of the rolls 3 changes abruptly, the roller 3 collides against the bar portion 7 of the cage 4 again and again. A load W exerted in the circumferential direction by the collision is applied from the roller 3 to the bar portion 7 of the cage 4 as shown in FIG. 2 to deform the cage 4 as shown in FIG. 5.

When the bending stress is loaded on the circular portion 5 and the bar portion 7 repeatedly, cracks occur in the circular portion 5 or the bar portion 7 which not only fractures the cage 4 but also sometimes makes the rotation of the bearing impossible during long time use.

Since the cracks occur at a connection portion between the circular portion 5 and the bar portions 7, it is necessary for preventing fracture of the cage 4 thereby preventing deterioration for the bearing life, to moderate the bending stress caused to the connection portion by the load W in the circumferential direction.

When the cage 4 is moved by the vibrations in the direction of a blank arrow in FIG. 4(A), the cage 4 is deformed as shown in FIG. 4 by the radial load W' exerted from the roller 3. That is, the load W' is exerted on the bar portion 7 at a position opposed substantially to a central portion in the axial direction of the roller, while a load balancing the load W' is exerted also to a connection portion between the circular portion 5 and the bar portion 7 and the circular portion 5 and the bar portion 7 undergo bending moments $M_1'$, $M_3'$, respectively, to deform as shown in FIGS. 4(B), (C). Let the bending stress caused to an area A of the circular portion 5 in the connection portion between the circular portion 5 and the bar portion 7 be denoted by $\sigma_1$, the bending stress caused to an area C of the bar portion 7 in the connection portion between the circular portion 5 and the bar portion 7 be denoted by $\sigma_3'$, each of the bending stresses $\sigma_1'$, $\sigma_3'$ is expressed by the following equations based on the conditions for the balance of forces in view of the strength of materials:

$$\sigma_1' = M_1' \cdot e_1' / I_1' \quad (1)$$

$$\sigma_3' = M_3' \cdot e_3' / I_3' \quad (2)$$

$I_1'$, $I_3'$ each express the moment of inertia of area for each of the circular portion 5 and the bar portion 7, and the moment of inertia of area $I_1'$, $I_3'$ are defined by the following equations:

$$I_1' = \int_{A1} y_1^2 \, dA_1 \quad (3)$$

$$I_3' = \int_{A3} y_3^2 \, dA_3 \quad (4)$$

$A_1$, $A_3$ in the equations (3), (4) described above each expresses, respectively, the cross sectional areas for each of circular portion 5, and the bar portion 7.

Further, $e_1'$, $e_3'$ in the equations (1), (2) described above express the maximum values of distance from the center of the graph to the edge of the cross sectional area in each of the coordinate systems to be described later.

Further, the coordinate system for each of the moment of inertia of area $I_1'$, $I_3'$ is defined as below. That is, as shown in FIG. 1, the moment of inertia of area $I_1'$ is in accordance with a $y_1$-$z_1$ orthogonal coordinate system, on the cross section of the circular portion 5, taking an axis $y_1$ in the direction of a normal line for the conical surface or cylindrical surface that defines the outer diametrical surface of the cage and taking an axis $z_1$ axially and in the direction of a tangential line for the conical surface or cylindrical surface, with respect to the center of the graph for the cross section as an origin, and this is a moment of inertia of area relative to a neutral axis parallel with the longitudinal direction of the bar portion 7. Further, the moment of inertia of area $I_3'$ is in accordance with a $y_3$-$z_3$ orthogonal coordinate system, on the cross section of the bar portion 7, taking an axis $y_3$ in the direction of a normal line for the conical surface or cylindrical surface and taking an axis $z_3$ circumferentially and in the direction of a tangential line for the conical surface or cylindrical surface, with respect to the center of the graph for the cross section as an origin, and this is a moment of inertia of area relative to a neutral axis parallel with the circumferential direction of the cage.

The longitudinal direction of the bar portion 7 means herein an axial direction or substantially axial direction of the bearing.

Then, $e_1'$ in the equation (1) above expresses the maximum value in the $y_1$ coordinate at the cross sectional edge of the circular portion 5 on the side of the bar portion. Further, $e_3'$ in the equation (2) above expresses the maximum value as the absolute value in the $y_3$ coordinate at the cross sectional edge of the bar portion 7.

Further, in a case where the cross sectional shape of the bar portion 7 does not change in the axial direction, since the moment of inertia of area for the bar portion 7 does not also change in the axial direction, $I_3'$ is defined as the value for the moment of inertia of area. However, in a case where the cross sectional shape of the bar portion 7 changes in the axial direction, the moment of inertia of area of the bar portion 7 also changes in the axial direction. In this case, $I_3'$ is defined as the moment of inertia of area at the connection portion C of the bar portion 7 with the circumferential portion 5.

As can be seen from the equation (1) and equation (2), each of the stresses $\sigma_1'$, $\sigma_3'$ is reduced by increasing all the moment of inertia of area $I_1'$, $I_3'$.

Further, as shown in FIG. 5 moment M is exerted on a connection portion between the circular portion 5 and bar portion 7 by the load W exerted from the circumferential direction from the roller 3.

Let the bending stress caused to the area A of the circular portion 5 in the connection portion between the circular portion 5 and the bar portion 7 be denoted by $\sigma_1$ and the bending stress caused to the area C of the bar portion 7 in the connection portion between the circular portion 5 and the bar portion 7 be denoted by $\sigma_3$, each of the bending stresses $\sigma_1$ and $\sigma_3$ is expressed by the following equation based on the conditions for the balance of forces in view of the strength of materials:

$$\sigma_1 = M \cdot e_1 / (2I_1) \tag{5}$$

$$\sigma_3 = M \cdot e_3 / I_3 \tag{6}$$

$I_1$ and $I_3$ described above are, respectively, the moment of inertia of area for each of the circular portion 5 and the bar portion 7, and the moment of inertia of area $I_1$ and $I_3$ are defined by the following equations:

$$I_1 = \int_{A_1} Z_1^2 dA_1 \tag{7}$$

$$I_3 = \int_{A_3} Z_3^2 dA_3 \tag{8}$$

$A_1$ and $A_3$ in the equations (7) and (8) express cross sectional areas for the circular portion 5 and the bar portion 7 respectively. Further, $e_1$ and $e_3$ in the equations (5), (6) above express maximum values of the distance from the center of the graph to the edge of cross sectional area in each of the coordinate systems to be described later.

Further, in the same manner as described above, coordinate system for each of the moment of inertia of area $I_1$, $I_3$ is defined as below. That is, as shown in FIG. 1, the moment of inertia of area $I_1$ is in accordance with a $y_1$-$z_1$ orthogonal coordinate system, on the cross section of the circular portion 5, taking an axis $y_1$ in the direction of a normal line for the cylindrical surface that defines the outer diametrical surface of the cage and taking an axis $z_1$ axially and in the direction of a tangential line for the cylindrical surface, with respect to the center of the graph for the cross section as an origin, and this is a moment of inertia of area relative to a neutral axis vertical to the longitudinal direction of the bar portion 7. Further, as shown in FIG. 1, the moment of inertia of area $I_3$ is in accordance with a $y_3$-$z_3$ orthogonal coordinate system, on the cross section of the bar portion 7, taking an axis $y_3$ in the direction of a normal line for the cylindrical surface and taking an axis $z_3$ circumferentially and in the direction of a tangential line for the cylindrical surface, with respect to the center of the graph for the cross section as an origin, and this is a moment of inertia of area relative to a neutral axis vertical to the circumferential direction of the cage.

Further, $e_1$ in the equation (5) above expresses the maximum value in the $z_1$ coordinate in the cross sectional edge of the circular portion 5 on the side of the bar portion. Further, $e_3$ in the equation (6) above expresses the maximum value in the $Z_3$ coordinate in the cross sectional edge of the bar portion 7.

In the comb-shaped cage, the cross sectional shape of the bar portion 7 is generally unchanged in the axial direction but the cross sectional shape of the bar portion 7 may sometimes be changed in the axial direction such as, for example, in a cage for use in a self-aligning roller bearing. In such a case, $I_3$ is defined as a moment of inertia of area at a connection portion C of the bar portion 7 with the circular portion 5.

As can be seen from the equation (5) and equation (6) above, each of the stresses $\sigma_1$, $\sigma_3$ is decreased by increasing all the moment of inertia of area $I_1$, $I_3$.

In view of the above, in the prior art, at least one of the sets of the moment of inertia of area $I_1'$, $I_3'$ or $I_1$, $I_3$ is increased by increasing all the cross sections for the circular portion 5 and the bar portion 7, to improve the strength of the cage 4 thereby preventing occurrence of fracture.

In this case, while it has been experientially recognized that the cross sectional area may be increased to improve the strength when the strength of the cage is low but it has not been designed by considering each of the moment of inertia of area for the circular portion 5 and the bar portions 7 and optimally combining the strength thereof.

Accordingly, in any type of the cages, when it is designed such that all the moment of inertia of area $I_1'$, $I_3'$ or all the moment of inertia of area $I_1$, $I_3$ for the circular portion 5 and the bar portion 7 are increased, since the space volume for holding the rollers 3 (size and number of pockets 8) is reduced, the number of the rollers 3 that can be assembled into the bearing is decreased or the size of the roller 3 has to be reduced as the strength of the cage 4 is improved to bring about a problem that the load capacity of the bearing is lowered. Further, it results in unnecessary increase of the weight of the cage.

Particularly, when it is intended to increase the strength to a composite load formed by both of the loads, namely, the load W' in the radial direction and the load W in the circumferential direction, all the moment of inertia of area $I_1'$, $I_3'$ and all the moment of inertia of area $I_1$, $I_3$ are increased and, as a result, the problem described above becomes conspicuous.

The present invention has been achieved while taking notice on such a problem and it is an object thereof to provide a cage for use in a roller bearing capable of improving the strength of the cage without lowering the load capacity of the bearing to which the cage is assembled.

SUMMARY OF THE INVENTION

It has been noted in each of the present inventions that the strength of the cage can be improved without lowering the load capacity of the bearing and suppressing increase in the weight of the cage, by optimizing the bending stress of the circular portion and the bending stress of the bar portion such that they are not different greatly from each other while considering the direction of load exerted from the roller.

That is, for solving the foregoing subject, the invention described in claim 1 provides a comb-shaped cage for use in a roller bearing having a circular portion axially opposing to the end surface of each of the rollers and a plurality of bar portions protruding from one or both sides of the circular portion and arranged circumferentially opposed to the rolling surface of each of rollers and which satisfies the condition:

$$0.2 \leq (I_1'/I_3') \leq 2.5$$

where $I_1'$ expresses the moment of inertia of area for the circular portion relative to a neutral axis parallel with the longitudinal direction of the bar portion and $I_3'$ expresses the moment of inertia of area for the bar portion relative to a neutral axis parallel with the circumferential direction of the cage.

In this case, in a cage for use in a roller bearing in which bar portions protrude from only one axial side of the circular portion and which is assembled into a double row cylindrical roller bearing, it is preferred to satisfy the condition:

$$0.3 \leq (I_1'/I_3') \leq 1.1.$$

Further, in a cage for use in a roller bearing in which the bar portions protrude from both axial sides of the circular portion and which is assembled into a double row cylindrical roller bearing, it is preferred to satisfy the condition:

$$0.3 \leq (I_1'/I_3') \leq 0.9.$$

Further, in a cage for use in a roller bearing in which the bar portions protrude from only one axial side of the circular portion and which is assembled into a self-aligning roller bearing, it is preferred to satisfy the condition:

$$0.3 \leq (I_1'/I_3') \leq 2.5.$$

Further, in a cage for use in a roller bearing in which the bar portions protrude from both axial sides of the circular portion and which is assembled into a self-aligning roller bearing, it is preferred to satisfy the condition:

$$0.2 \leq (I_1'/I_3') \leq 1.0.$$

When $I_1$ expresses the moment of inertia of area for the circular portion relative to a neutral axis vertical to the longitudinal direction of the bar portion and $I_3$ expresses the moment of inertia of area for the bar portion relative to a neutral axis vertical to the circumferential direction of the cage in addition to any one of the conditions above or independently of the condition above, it is possible to provide a cage for use in roller bearing having excellent strength characteristics by satisfying the condition:

$$0.3 \leq (I_1/I_3) \leq 1.6.$$

In this case, in a cage for use in a roller bearing in which bar portions protrude from only one axial side of the circular portion and which is assembled into a double row cylindrical roller bearing, it is preferred to satisfy the condition:

$$0.3 \leq (I_1/I_3) \leq 0.9.$$

Further, in a cage for use in a roller bearing in which the bar portions protrude from both axial sides of the circular portion and which is assembled into a double row cylindrical roller bearing, it is preferred to satisfy the condition:

$$0.7 \leq (I_1/I_3) \leq 1.6.$$

Further, in a cage for use in a roller bearing in which the bar portions protrude from only one axial side of the circular portion and which is assembled into a self-aligning roller bearing, it is preferred to satisfy the condition:

$$0.5 \leq (I_1/I_3) \leq 1.5.$$

Further, in a cage for use in a roller bearing in which the bar portions protrude from both axial sides of the circular portion and which is assembled into a self-aligning roller bearing, it is preferred to satisfy the condition:

$$0.3 \leq (I_1/I_3) \leq 1.0.$$

In any of the present inventions described above, the strength of the cage is improved without lowering the load capacity of the bearing since it is designed such that the bending stress for each of the circular portions and the bending stress for the bar portion are not greatly different from each other in accordance with the type of the cage while considering the direction of load exerted from the roller.

Then, the ground is to be described.

Each of the loads in the radial direction and the circumferential direction of the bearing is exerted independently or simultaneously depending on the used portion of the bearing for assembling. Description is to be made based on the grounds to the respective loads.

At first, description is to be made to a case where the load W' is applied from the roller to the cage in the radial direction by vibrations of the cage in the radial direction.

For example, in a case where the bending stress $\sigma_1'$ for the circular portion 5 is extremely larger compared with the bending stress $\sigma_3'$ for the bar portion 7, that is, $\sigma_1' \gg \sigma_3'$, since fracture of the cage 4 occurs at the area A of the circular portion 5 shown in FIG. 4, the strength can be improved by increasing the moment of inertia of area $I_1'$ for the circular portion 5 and, at the same time, decreasing the moment of inertia of area $I_3'$ for the bar portion 7 such that the space volume for holding the roller is not decreased.

The moment of inertia of area can be increased usually by increasing the cross section thereof, while the moment of inertia of area can be decreased usually by decreasing the cross sectional area thereof. It is of course possible to change the moment of inertia of area by modifying the cross sectional shape.

On the contrary, in a case where the bending stress $\sigma_3'$ for the bar portion 7 is extremely larger compared with the bending stress $\sigma_1'$ for the circular portion 5, that is, $\sigma_3' \gg \sigma_1'$, since fracture of the cage 4 occurs at the area C of the bar portion 7, the strength can be improved by increasing the moment of inertia of area $I_3'$ for the bar portion 7 and, at the same time, decreasing the moment of inertia of area $I_1'$ for the circular portion 5 such that the space volume for holding the roller 3 is not decreased.

That is, in a case where there is a significant difference between the bending stress $\sigma_1'$ for the circular portion 5 and the bending stress $\sigma_3'$ for the bar portion 7, occurrence of fracture of the cage 4 can be prevented without decreasing the number of rollers or the size of the rollers, namely, without lowering the load capacity of the bearing, relative to the radial load W' by reducing the difference between the bending stress $\sigma_1'$ and the bending stress $\sigma_3'$.

It is considered in the present invention to apply an optimal design of improving the load capacity for the entire cage by increasing the moment of inertia of area only for the portion where the bending stress increases, instead of improving the strength of the cage 4 by increasing all the moment of inertia of area for each portion of the cage 4 as in the prior art.

With the view point described above, according to the present invention, $(I_1'/I_3')$ for minimizing the maximum value of the bending stress is defined based on values for dimensional factors for each of the portions within the possible range in view of the design.

Then, the critical meanings for each $(I_1'/I_3')$ relative to the radial load W' is to be described for the invention defined in claims 1 to 5.

When the relation between the non-dimensional maximum bending stress $(\sigma'/\sigma_0')$, and $(I_1'/I_3')$ was calculated on the basis of the model for the strength of materials, the result as shown in FIG. 6 was obtained.

The non-dimensional maximum bending stress $(\sigma'/\sigma_0')$ is considered here because a non-dimensional concept can be applied to any magnitude of load, to improve the general utilizability.

Further, $\sigma$ described above is maximum among the bending stress $\sigma_1'$ for the circular portion 5 in the connection portion between the circular portion 5 and the bar portion 7 and the bending stress $\sigma_3'$ for the bar portion 7 in the connection portion between the circular portion 5 and the bar portion 7. Smaller $\sigma'$ means less fragility of the cage 4 caused by collision between the roller 3 and the bar portion 7.

Further, $\sigma_0'$ is the maximum bending stress caused to the bar portion 7 when the circular portions 5 is regarded as a rigid body.

The $(\sigma'/\sigma_0')$ can be calculated if three parameters $(I_1'/I_3')$, $(e_1'/e_3')$, and $(d_1'/d_3')$ are given.

In this case, $d_1$ is a circumferential distance between two bar portions 7, 7 adjacent in the circumferential direction, as shown in FIG. 4(B). Further, when the cage is one component type, the two bar portions 7, 7 adjacent in the circumferential direction protrude from the axial sides of the cage opposite to each other relative to the circular portion 5 as shown in FIG. 3.

Further $d_3'$ is an axial distance from the position at which load W' caused by collision with the roller 3 is exerted on the side of the bar portion 7 opposing to the rolling surface of the roller (position at arrow W' in FIG. 4) to the side of the circular portion 5 opposing to the end surface of the roller 3. Further, the value of $d_3'$ is usually identical with the value of $d_3$ described later.

Then, in most of comb-shaped cages for use in the roller bearing, since adaptable ranges in view of the dimensional factors are $(e_1'/e_3')=1.0$ to 1.8, and $(d_1/d_3')=0.2$ to 3.0, respectively, each of the parameters: $(e_1'/e_3')$ and $(d_1/d_3')$ is changed at random within the ranges: $(e_1'/e_3')=1.0$ to 1.8, and $(d_1/d_3')=0.2$ to 3.0 to determine the relation between $(I_1'/I_3')$ when $(\sigma'/\sigma_0')$ takes the minimum value, and the minimum value $(\sigma'/\sigma_0')$ as shown in FIG. 6.

As can be seen from FIG. 6, if $(I_1'/I_3')=0.2$ to 2.5, it takes an optimal value among possible range of design to minimize $(\sigma'/\sigma_0')$, and it is possible to prevent the fracture of the cage for use in the roller bearing.

Based on this, it is defined in the present invention as:

$$0.2 \leq (I_1'/I_3') \leq 2.5.$$

Then, symbols X in FIG. 6 are examples of determining $(I_1'/I_3')$ for minimizing $(\sigma'/\sigma_0')$ in cases where one of $(e_1'/e_3')$ and $(d_1/d_3')$ is not contained within the ranges: $(e_1'/e_3')=1.0$ to 1.8, and $(d_1/d_3')=0.2$ to 3.0, respectively. $(I_1'/I_3')$ is not contained within the range: $(I_1'/I_3')=0.2$ to 2.5, and such a cage is of an unpractical size for the value of $(e_1'/e_2')$ or $(d_1/d_3')$, which is not used actually.

Further, since most of cages for use in the double row cylindrical roller bearing, in a case where the cage is a two component type, are within the ranges: $(e_1'/e_3')=1.0$ to 1.1, and $(d_1/d_3')=0.6$ to 2.2, $(e_1'/e_3')$, $(d_1/d_3')$ were changed at random as the parameters within the ranges and the relation between $(I_1'/I_3')$ where $(\sigma'/\sigma_0')$ takes a minimum value, and the minimum value $(\sigma'/\sigma_0')$ was determined. The result is shown in FIG. 7.

As can be seen from FIG. 7, if $(I_1'/I_3')=0.3$ to 1.1, $(\sigma'/\sigma_0')$ is minimized and it is possible to prevent the fracture of the cage for use in the double row cylindrical roller bearing. That is, it can be seen that the two component type cage for use in the double row cylindrical roller bearing is preferable when it is designed optimally so as to provide:

$$0.3 \leq (I_1'/I_3') \leq 1.1.$$

Further, since most of cages for use in the double row cylindrical roller bearings, in a case where the cage is a one component type, are within the ranges: $(e_1'/e_3')=1.0$ to 1.1, and $(d_1/d_3')=0.6$ to 1.8, $(e_1'/e_3')$, $(d_1/d_3')$ were changed at random as the parameters within the ranges and the relation between $(I_1'/I_3')$ where $(\sigma'/\sigma_0')$ takes a minimum value, and the minimum value $(\sigma'/\sigma_0')$ was determined. The result is shown in FIG. 8.

As can be seen from FIG. 8, if $(I_1'/I_3')=0.3$ to 0.9, $(\sigma'/\sigma_0')$ is minimized and it is possible to prevent the fracture of the cage for use in the double row cylindrical roller bearing. That is, it can be seen that the one component type cage for use in the double row cylindrical roller bearing is preferable when it is designed optionally so as to provide:

$$0.3 \leq (I_1'/I_3') \leq 0.9.$$

Further, since most of cages for use in the self-aligning roller bearings, in a case where the cage is a two component type, are within the ranges: $(e_1'/e_3')=1.0$ to 1.8, and $(d_1/d_3')=0.6$ to 3.0, $(e_1'/e_3')$, $(d_1/d_3')$ were changed at random as the parameters within the ranges and the relation between $(I_1'/I_3')$ where $(\sigma'/\sigma_0')$ takes a minimum value, and the minimum value $(\sigma'/\sigma_0')$ was determined. The result is shown in FIG. 9.

As can be seen from FIG. 9, if $(I_1'/I_3')=0.3$ to 2.5, $(\sigma'/\sigma_0')$ is minimized and it is possible to prevent the fracture of the cage for use in the self-aligning roller bearing. That is, it can be seen that the two component type cage for use in the self-aligning roller bearing is preferable when it is designed optimally so as to provide:

$$0.3 \leq (I_1'/I_3') \leq 2.5.$$

Further, since most of cages for use in the self-aligning roller bearings, in a case where the cage is a one component type, are within the ranges: $(e_1'/e_3')=1.0$ to 1.8, and $(d_1'/d_3')=0.2$ to 1.2, $(e_1'/e_3')$, $(d_1'/d_3')$ were changed at random as the parameters within the ranges and the relation between $(I_1'/I_3')$ where $(\sigma'/\sigma_0')$ takes a minimum value, and the minimum value $(\sigma'/\sigma_0')$ was determined. The result is shown in FIG. 10.

As can be seen from FIG. 10, if $(I_1'/I_3')=0.2$ to 1.0, $(\sigma'/\sigma_0')$ is minimized and it is possible to prevent the fracture of the cage for use in the self-aligning roller bearing. That is, it can be seen that the one component type cage for use in the self-aligning roller bearing is preferable when it is designed optimally so as to provide:

$$0.2 \leq (I_1'/I_3') \leq 100.$$

As can be seen from FIG. 6 to FIG. 10, as the value $(I_1'/I_3')$ is smaller, the value $(\sigma'/\sigma')$ is increased to apparently result in disadvantage and the impact shock durability is lowered. Accordingly, it is preferred to set the value $(I_1'/I_3')$ greater within each of the ranges described above depending on the conditions used.

Then, the ground for a case where a load W is applied from the revolutional direction of the roller (circumferential direction), that is, the value of the ratio $(I_1/I_3)$ between the moment of inertia of area $I_1$ for the circular portion relative to the neutral axis vertical to the longitudinal direction of the bar portion and the moment of inertia of area $I_3$ relative to the neutral axis vertical to the circumferential direction of the cage is to be described with reference to FIGS. 11 to 15.

For example, in a case where the bending stress $\sigma_1$ for the circular portion 5 is extremely larger compared with the bending stress $\sigma_3$ for the bar portion 7, that is, $\sigma_1 >> \sigma_3$, since fracture of the cage 4 occurs at the area A of the circular portion 5, the strength can be improved by increasing the moment of inertia of area $I_1$ for the circular portion 5 and, at the same time, decreasing the moment of inertia of area $I_3$ for the bar portion 7 such that the space volume for holding the roller 3 is not decreased. The moment of inertia of area can be decreased usually by decreasing the cross sectional area thereof. It is of course possible to change the moment of inertia of area by modifying the cross sectional shape.

On the contrary, in a case where the bending stress $\sigma_3$ for the bar portion 7 is extremely larger compared with the bending stress $\sigma_1$ for the circular portion 5, that is, $\sigma_3 >> \sigma_1$, since fracture of the cage 4 occurs at the area C of the bar portion 7, the strength can be improved by increasing the moment of inertia of area $I_3$ for the bar portion 7 and, at the same time, decreasing the moment of inertia of area $I_1$ for the circular portion 5 such that the space volume for holding the roller 3 is not decreased.

That is, in a case where there is a significant difference between the bending stress $\sigma_1$ for the circular portion 5 and the bending stress $\sigma_3$ for the bar portion 7, fracture of the cage 4 to the load can be prevented by reducing the difference of the stress without decreasing the number of rollers or the size of the rollers.

It is considered in present invention to apply an optimal design of improving the load capacity for the entire cage by increasing the moment of inertia of area only for the portion where the bending stress increases, instead of improving the strength of the cage 4 by increasing all the moment of inertia of area for respective portions of the cage 4 as in the prior art.

With the view point described above, according to the present invention, $(I_1/I_3)$ for minimizing the maximum value of the bending stress is defined based on the values for dimensional factors for each of the portions within the adaptable range in view of the design.

Then, the critical meanings for the value of $(I_1/I_3)$ are to be described.

When the relation between the non-dimensional maximum bending stress $(\sigma'/\sigma_0)$ and $(I_1/I_3)$ is calculated on the basis of the model in view of the strength of materials, a result as shown in FIG. 11 was obtained. The non-dimensional maximum bending stress $(\sigma/\sigma_0)$ is considered here because a non-dimensional concept can be applied to any magnitude of load, to improve the general utilizability.

Further, $\sigma$ described above is maximum among the bending stress $\sigma_1$ for the circular portion 5 in the connection portion between the circular portion 5 and the bar portion 7 and the bending stress $\sigma_3$ for the bar portion 7 in the connection portion between the circular portion 5 and the bar portion 7, based on the definition described above. Smaller $\sigma$ means less fragility of the cage 4 caused by collision between the roller 3 and the bar portion 7. Further, $\sigma_0$ is the maximum bending stress caused to the bar portion 7 when the circular portion 5 is regarded as a rigid body.

The $(\sigma/\sigma_0)$ can be calculated if three parameters $(I_1/I_3)$, $(e_1/e_3)$ and $(d_1/d_3)$ are given.

Then, as shown in FIG. 2, $d_1$ is a circumferential distance between two bar portions 7, 7 adjacent in the circumferential direction. The two bar portions 7, 7 adjacent in the circumferential direction protrude from the sides of the cage opposite to each other in the axial direction of the cage relative to the circular portion 5 in a case where the cage is a one component type as shown in FIG. 3.

Further, $d_3$ is an axial distance from a position where load W is exerted by collision with the roller 3 (position of arrow F in FIG. 2) on the side of the bar portion 7 opposing to the rolling surface of the roller 3 to the side of the circular portion 5 opposed to the end surface of the roller 3.

Then, in most of cages for use in the roller bearing, since $(e_1/e_3)=0.6$ to 3.2 and $(d_1/d_3)=0.2$ to 3.0, each of the parameters: $(e_1/e_2)$ and $(d_1/d_3)$ was changed at random within the ranges: $(e_1/e_3)=0.6$ to 3.2 and $(d_1/d_3)=0.2$ to 3.0 to determine the relation between $(I_1/I_3)$ where $(\sigma/\sigma_0)$ takes the minimum value, and the minimum value $(\sigma/\sigma_0)$ as shown in FIG. 11.

As can be seen from FIG. 11, if $(I_1/I_3)=0.3$ to 1.6, it takes an optimal value among possible range of design to minimize $(\sigma/\sigma_0)$, and it is possible to prevent the fracture of the cage for use in the roller bearing.

Based on this, it is defined in the present invention as:

$$0.3 \leq (I_1/I_3) \leq 1.6.$$

Then, symbols X in FIG. 11 are examples of determining $(I_1/I_3)$ for minimizing $(\sigma/\sigma_0)$ in cases where $(e_1/e_3)$ is not contained within the ranges: $(e_1/e_3)=0.6$ to 3.2. In this case, $(I_1/I_3)$ is not contained within the ranges: $(I_1/I_3)=0.3$ to 1.6 but such a cage is of an unpractical size with the value for $(e_1/e_3)$ being not used actually.

Further, a double row cylindrical roller bearing or a self-aligning roller bearing is often used in such places where extremely large loads are applied on the bearing as in various kinds of iron making rolling mills. Since most of double row cylindrical roller bearings, in a case where the cage is a two component type, are within the ranges: $(e_1/e_3)=0.6$ to 1.8, and $(d_1/d_3)=0.6$ to 2.2, $(e_1/e_3)$ and $(d_1/d_3)$ were changed at random as parameters within the ranges described above and the relation between $(I_1/I_3)$ where $(\sigma/\sigma_0)$ takes a minimum value, and the minimum value $(\sigma/\sigma_0)$ was determined. The result is shown in FIG. 12.

As can be seen from FIG. 12, if $(I_1/I_3)=0.3$ to 0.9, $(\sigma/\sigma_0)$ is minimized, and it is possible to prevent the fracture of the cage for use in the double row cylindrical roller bearing. That is, it can be seen that the two component type cage for use in the double row cylindrical roller bearing is preferable when it is designed optimally so as to provide:

$$0.3 \leq (I_1/I_3) \leq 0.9.$$

Further, since most of double row cylindrical roller bearings, in a case where the cage is a one component type, are within the ranges: $(e_1/e_3)=1.4$ to 3.2, and $(d_1/d_3)=0.6$ to 1.8, $(e_1/e_3)$ and $(d_1/d_3)$ were changed at random as parameters within the ranges described above and the relation between $(I_1/I_3)$ where $(\sigma/\sigma_0)$ takes a minimum value, and the minimum value $(\sigma/\sigma_0)$ was determined. The result is shown in FIG. 13.

As can be seen from FIG. 13, if $(I_1/I_3)=0.7$ to 1.6, $(\sigma/\sigma_0)$ is minimized, and it is possible to prevent the fracture of the cage for use in the double row cylindrical roller bearing. That is, it can be seen that the one component type cage for use in the double row cylindrical roller bearing is preferable when it is designed optimally so as to provide:

$$0.7 \leq (I_1/I_3) \leq 1.6.$$

Further, since most of self-aligning roller bearings, in a case where the cage is a two component type, are within the ranges: $(e_1/e_3)=1.0$ to 3.0, and $(d_1/d_3)=0.6$ to 3.0, $(e_1/e_3)$ and $(d_1/d_3)$ were changed at random as parameters within the ranges described above and the relation between $(I_1/I_3)$ where $(\sigma/\sigma_0)$ takes a minimum value, and the minimum value $(\sigma/\sigma_0)$ was determined. The result is shown in FIG. 14.

As can be seen from FIG. 14, if $(I_1/I_3)=0.5$ to 1.5, $(\sigma/\sigma_0)$ is minimized, and it is possible to prevent the fracture of the cage for use in the self-aligning roller bearing. That is, it can be seen that the two component type cage for use in the self-aligning roller bearing is preferable when it is designed optimally so as to provide:

$$0.5 \leq (I_1/I_3) \leq 1.5.$$

Further, since most of self-aligning roller bearings, in a case where the cage is a one component type, are within the ranges: $(e_1/e_3)=0.6$ to 2.0, and $(d_1/d_3)=0.2$ to 1.2, $(e_1/e_3)$ and $(d_1/d_3)$ were changed at random as parameters within the ranges described above and the relation between $(I_1/I_3)$ where $(\sigma/\sigma_0)$ takes a minimum value, and the minimum value $(\sigma/\sigma_0)$ was determined. The result is shown in FIG. 15.

As can be seen from FIG. 15, if $(I_1/I_3)=0.3$ to 1.0, $(\sigma/\sigma_0)$ is minimized, and it is possible to prevent the fracture of the cage for use in the self-aligning roller bearing. That is, it can be seen that the one component type cage for use in the self-aligning roller bearing is preferable when it is designed optimally so as to provide:

$$0.3 \leq (I_1/I_3) \leq 1.0.$$

As can be seen from FIG. 11 to FIG. 15, as the value $(I_1/I_3)$ is larger, the value $(\sigma/\sigma_0)$ also increases to result in apparently disadvantage and weaken the impact resistance. Accordingly, it is desirable to keep the value $(I_1/I_3)$ smaller depending on the conditions used.

The descriptions above are limited to cases where the load W' exerted in the radial direction of the cage and where the W exerted in the revolutional direction of the roller (circumferential direction) are exerted individually but, to improve the strength for the composite load exerted from both loads W' and W, it is desired to be designed such that both of $(I_1/I_3)$ and $(I_1'/I_3')$ are within the range described above respectively.

DETAILED DESCRIPTION OF THE PREFERRED EMBODIMENTS

Then, a first embodiment of the present invention is to be described with reference to the drawings.

The first embodiment is an example of a cage assembled in a roller bearing used in such places as railway vehicles where vibrations occur frequently in the bearing radial direction of a cage and rollers repeat radial collision against the bar portions of the cage. Further, a second embodiment is an example of a cage assembled in a roller bearing used in such places where rollers repeat circumferential collision against the bar portions of the cage due to the change of the rotational speed of the roller.

Figure 1A:
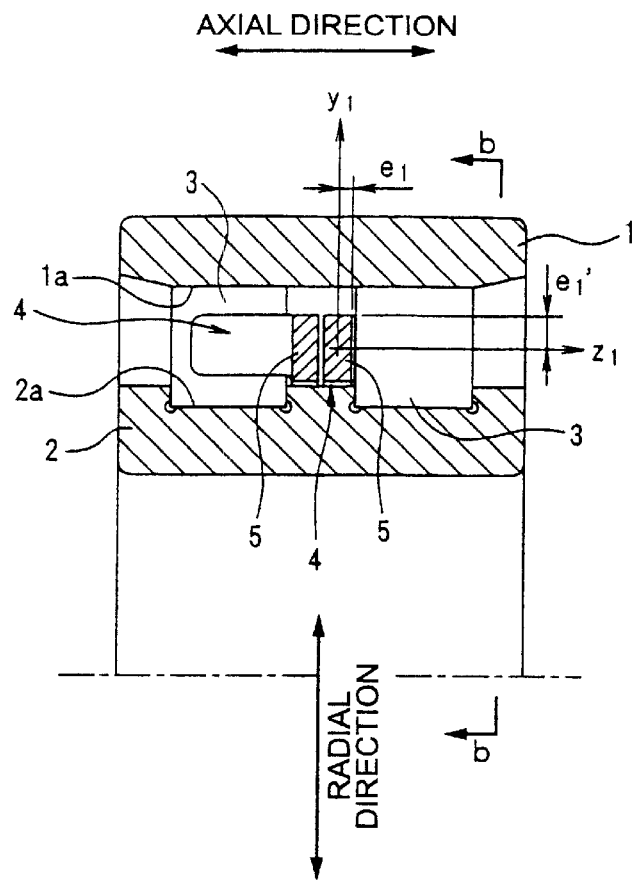
FIG. 1 is a view showing a double row cylindrical roller bearing, in which (A) is a fragmentary cross sectional view thereof and (B) is a b—b cross sectional view thereof.
Figure 1B:
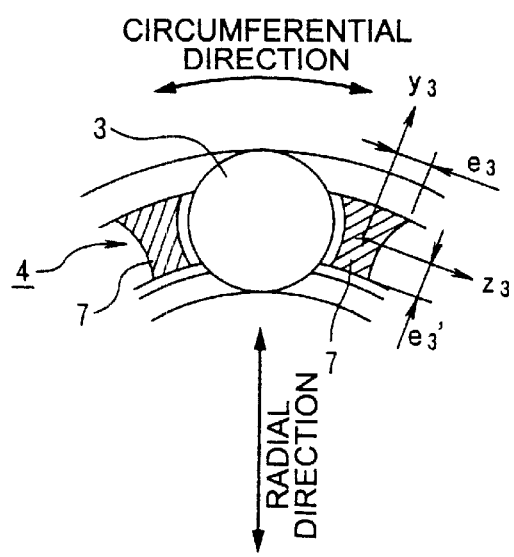
Figure 2:
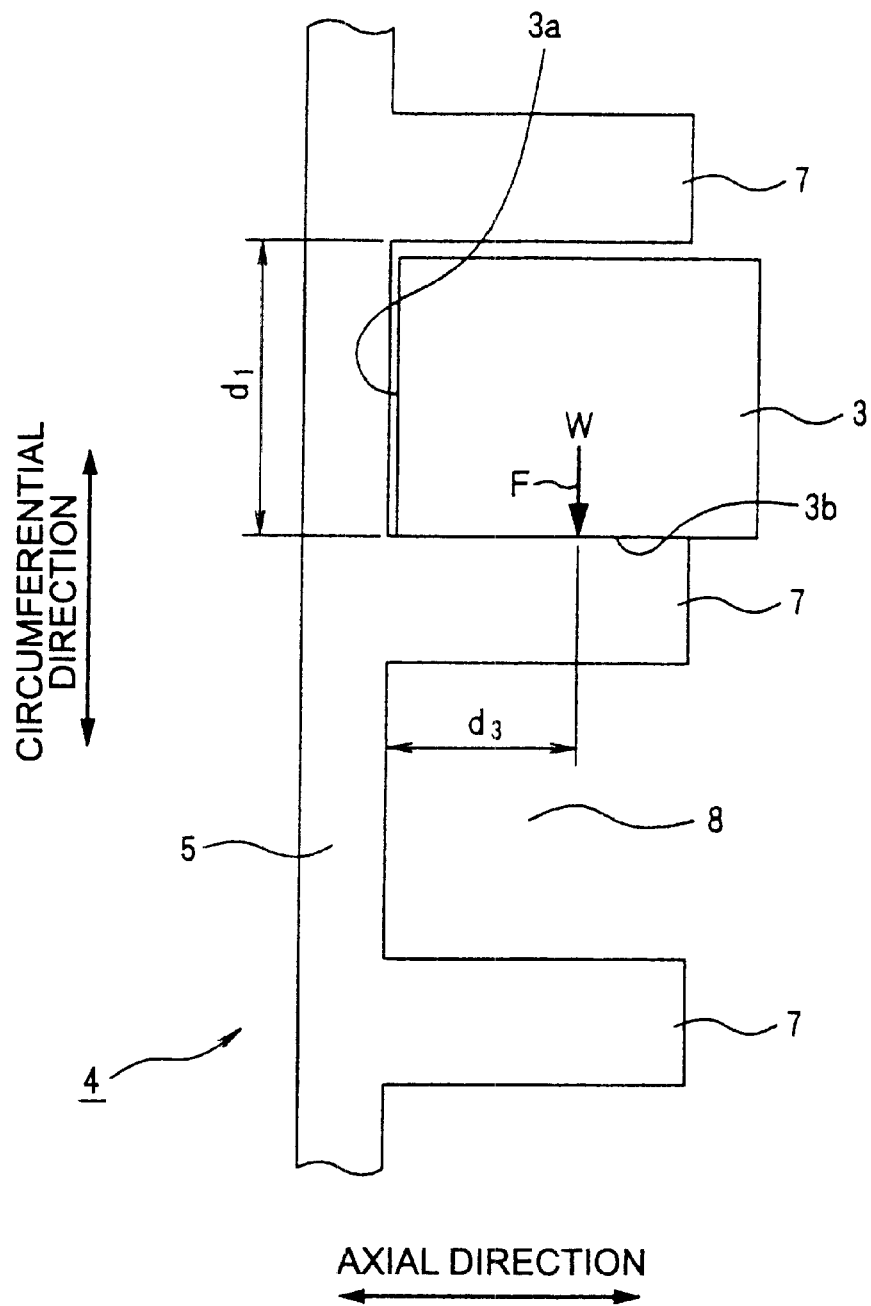
FIG. 2 is a fragmentary plane view of a two component type cage for use in a double row cylindrical roller bearing.
Figure 3:
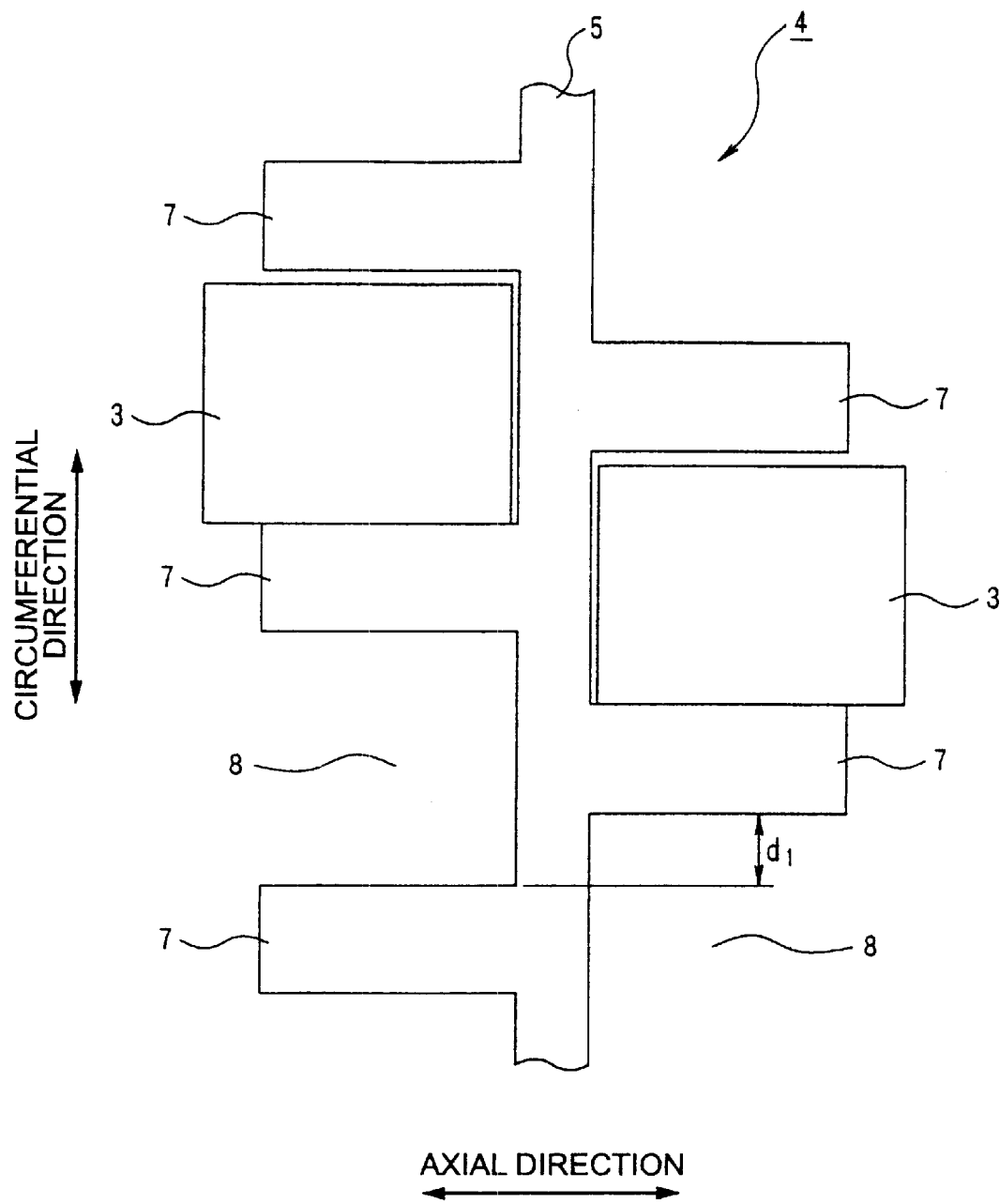
FIG. 3 is a fragmentary plane view of a one component type cage for use in a double row cylindrical roller bearing.
Figure 4A:
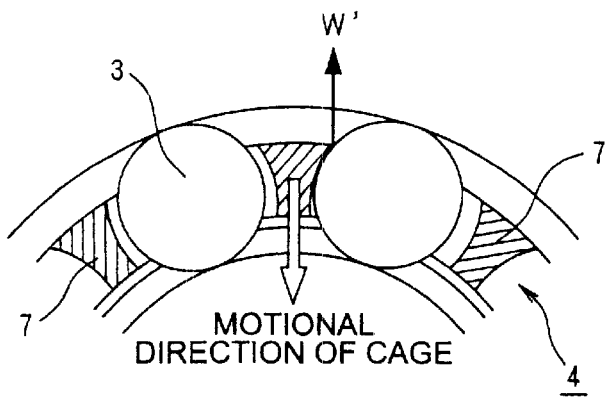
FIG. 4 is a schematic view showing the deformation of a cage caused by collision along a radial direction between a roller and a bar portion in a cage for use in a double row cylindrical roller bearing in which (A) is fragmentary cross sectional view, and (B), (C) show fragmentary perspective view respectively.
Figure 4B:
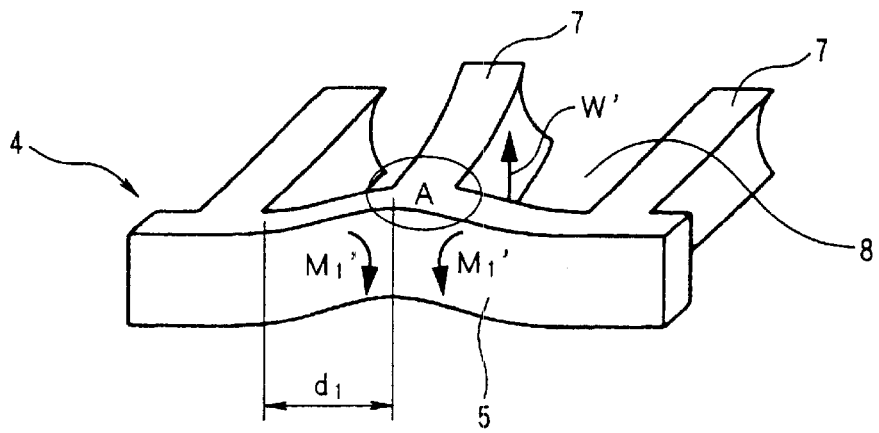
Figure 4C:
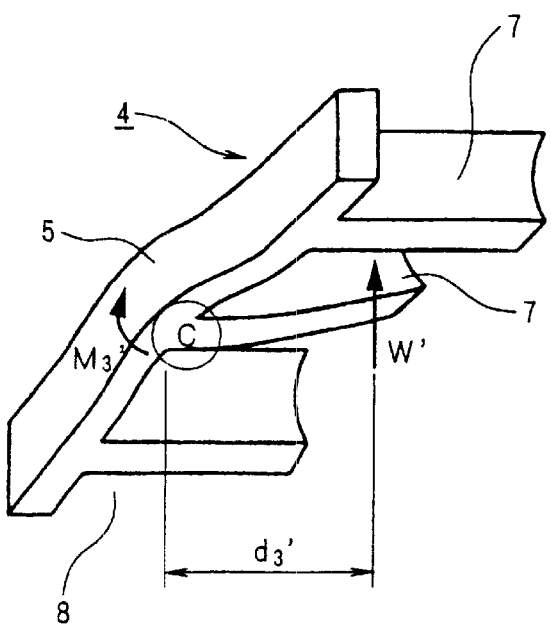
Figure 5:
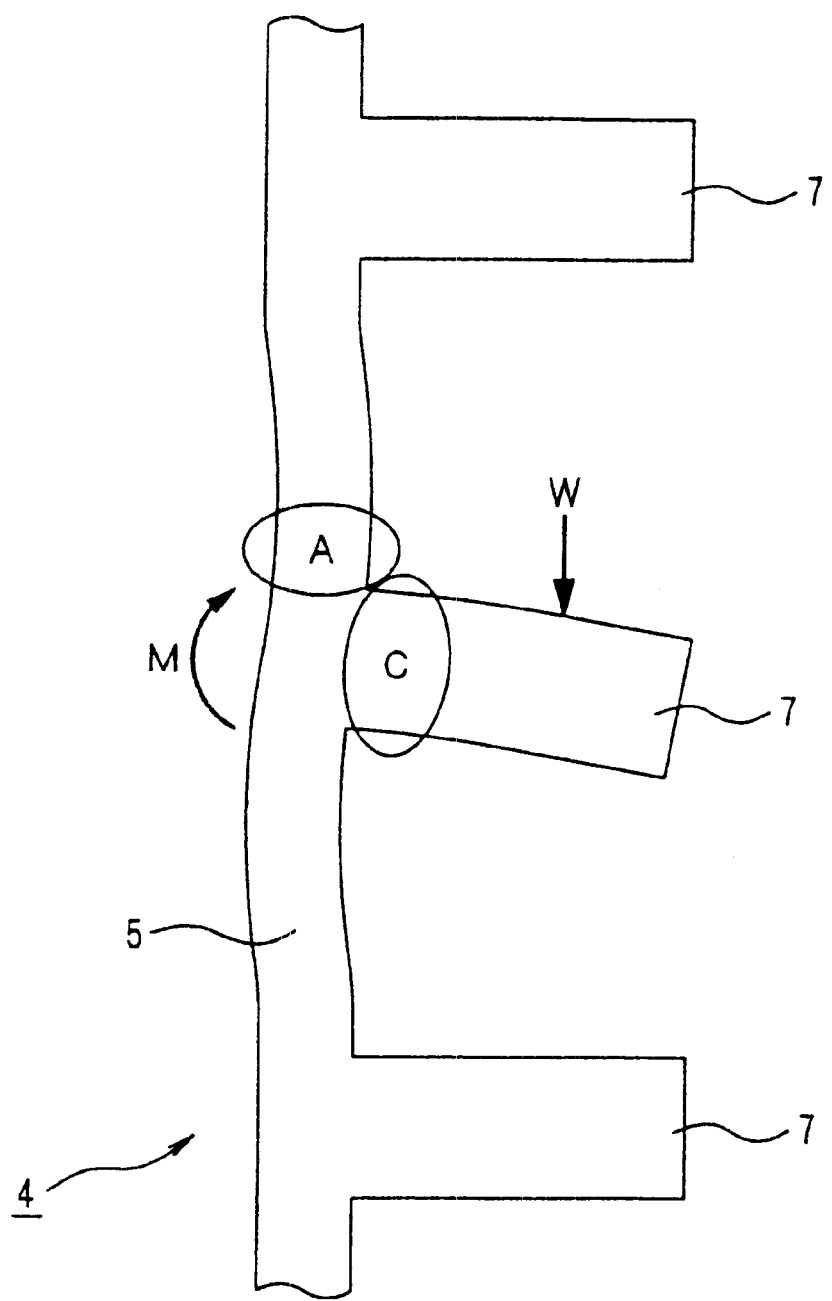
FIG. 5 is a schematic view showing the deformation of a cage caused by collision along a circumferential direction between a roller and a bar portion in a cage for use in a double row cylindrical roller bearing.
Figure 6:
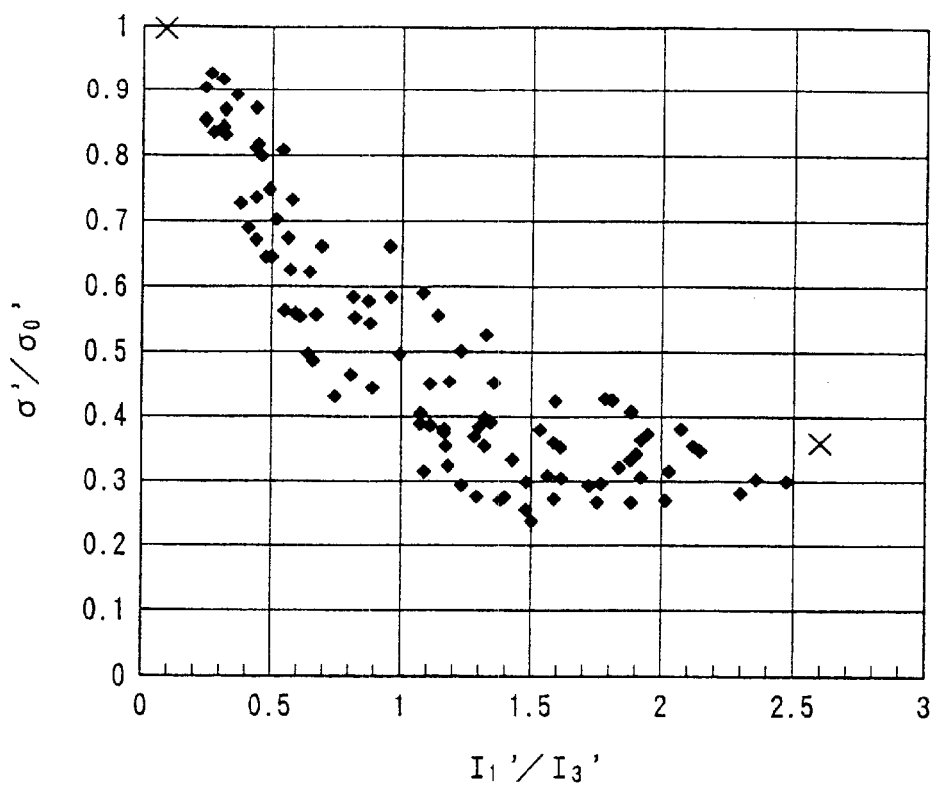
FIG. 6 is a graph showing the result of calculation for the non-dimensional maximum bending stress caused by collision between a roller and a bar portion in a cage for use in a roller bearing according to the present invention.
Figure 7:
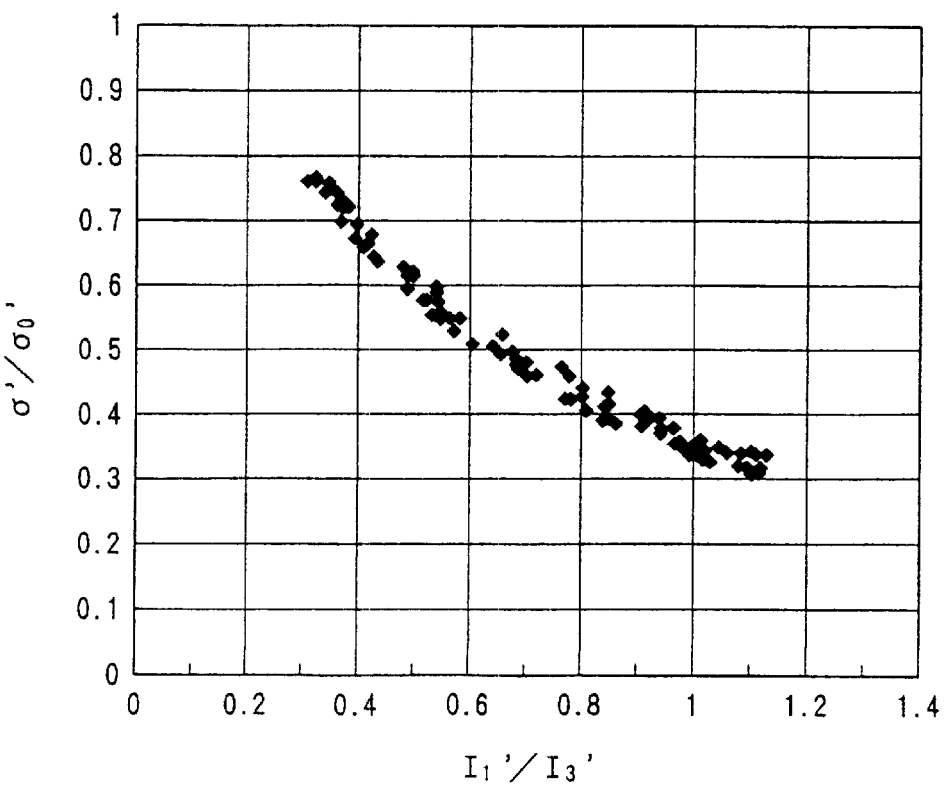
FIG. 7 is a graph showing the result of calculation for the non-dimensional maximum bending stress caused by collision between a roller and a bar portion in a two component type cage for use in a double row cylindrical roller bearing according to the present invention.
Figure 8:
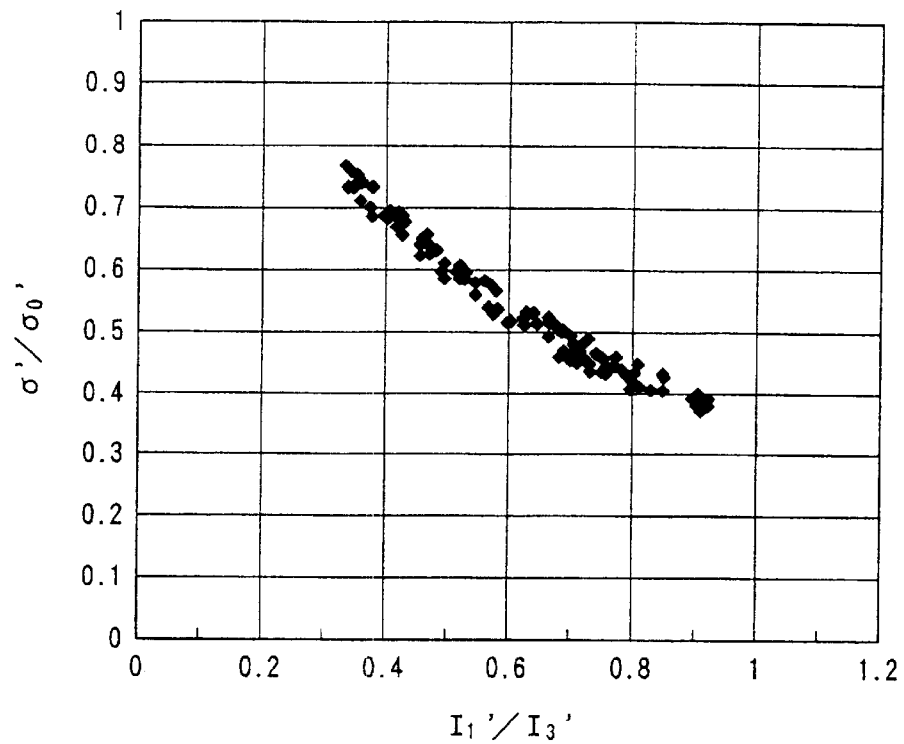
FIG. 8 is a graph showing the result of calculation for the non-dimensional maximum bending stress caused by collision between a roller and a bar portion in a one component type cage for use in a double row cylindrical roller bearing according to the present invention.
Figure 9:
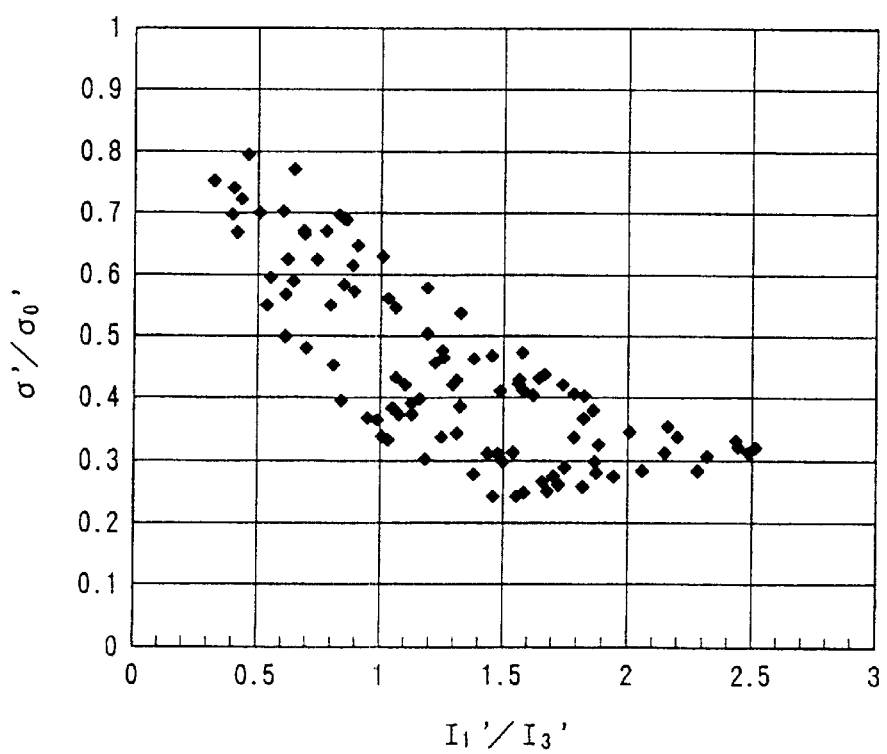
FIG. 9 is a graph showing the result of calculation for the non-dimensional maximum bending stress caused by collision between a roller and a bar portion in a two component type cage for use in a self-aligning roller bearing according to the present invention.
Figure 10:
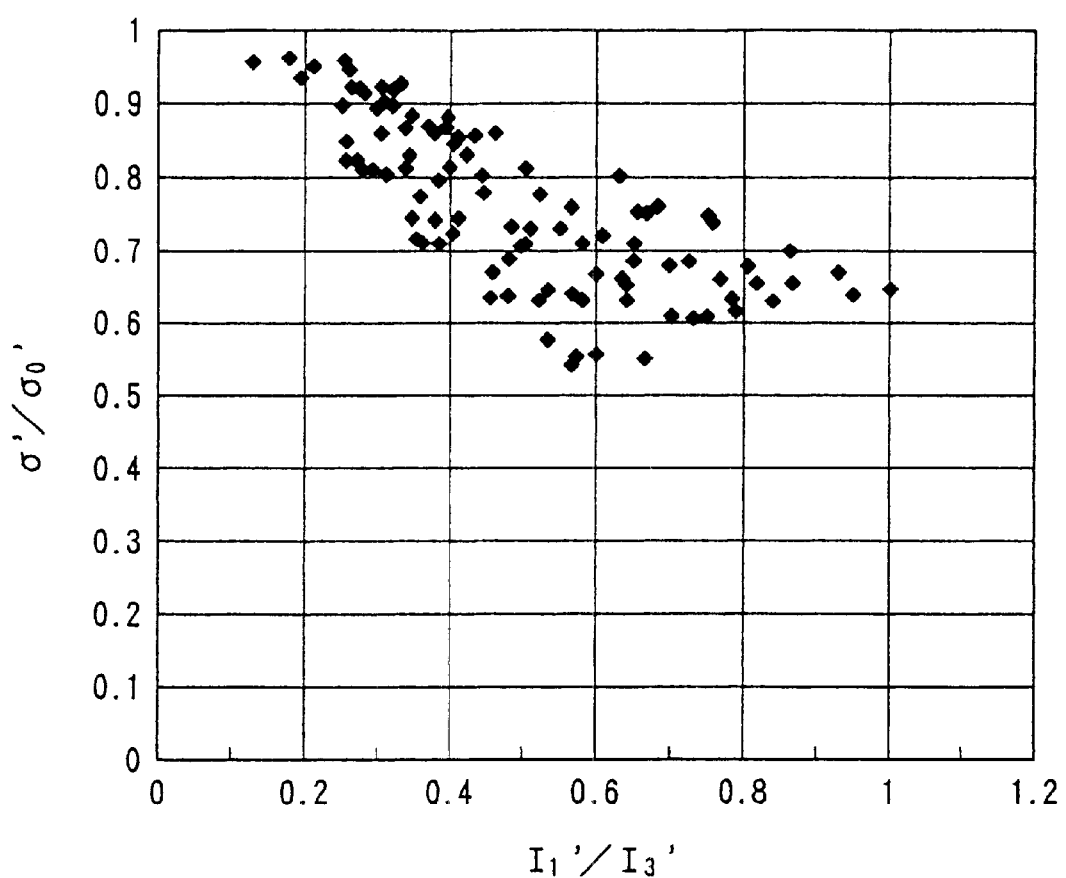
FIG. 10 is a graph showing the result of calculation for the non-dimensional maximum bending stress caused by collision between a roller and a bar portion in a one component type cage for use in a self-aligning roller bearing according to the present invention.

The cage 4 of the first embodiment is assembled in a double row cylindrical roller bearing as shown in FIG. 1.

Then, the width for the circular portion 5 and the bar portion 7 was set such that each moment of inertia of area $I_1'$, $I_3'$ for the circular portion 5 and the bar portion 7 is:

$$0.2 \leq (I_1'/I_3') \leq 2.5.$$

Thus, the strength of the cage 4 was improved without decreasing the number of pockets 8 and the volume of the space for each of the pockets 8 of by so much.

That is, since the bending stress for the circular portion 5 and the bending stress for the bar portion 7 were optimally designed such that they were not different greatly from each other, fracture of the cage 4 caused by collision between the roller 3 and the bar portion 7 could be prevented without lowering the load capacity of the bearing.

Then, the second embodiment of the present invention is to be described with reference to the drawings.

The cage 4 of this embodiment is assembled in a double row cylindrical roller bearing as shown in FIG. 1.

Each width for the circular portion 5 and bar portion 7 was set such that each moment of inertia of area $I_1$ and $I_3$ for the circular portion 5 and the bar portion 7 is:

$$0.3 \leq (I_1/I_3) 1.6.$$

Thus, the strength of the cage 4 was improved without decreasing the number of pockets 8 and the volume of the space for each of the pockets by so much.

That is, since the bending stress for the circular portion 5 and the bending stress for the bar portion 7 were optimally designed such that they were not different greatly from each other, fracture of the cage 4 caused by collision between the roller 3 and the bar portion 7 could be prevented without lowering the load capacity of the bearing.

The first and the second embodiments are embodiments in which the strength is optimized to one of the circumferential collision and radial collision respectively. In a case of use in such a place that both of the radial collision and the circumferential collision occur repeatedly, the width and the cross sectional shape for each of the circular portion 5 and the bar portion 7 may be set such that each of the moment of inertia of area $I_1'$, $I_3'$ and $I_1$, $I_3$ for a pair of the circular portion 5 and the bar portion 7 is: $0.2 \leq (I_1'/I_3') \leq 2.5$ and $0.3 \leq (I_1/I_3) \leq 1.6$ respectively. With such a constitution, since the bending stress for the circular portion 5 and the bending stress for the bar portion 7 are designed optimally so as not to be different greatly from each other even in a case where they undergo repeatedly both of the circumferential collision and the radial collision individually or as a composite load, fracture of the cage 4 caused by collision between the roller 3 and the bar portion 7 could be prevented without lowering the load capacity of the bearing.

Then, examples related to each of the embodiments described above are to be described.

EXAMPLE 1

Figure 16:
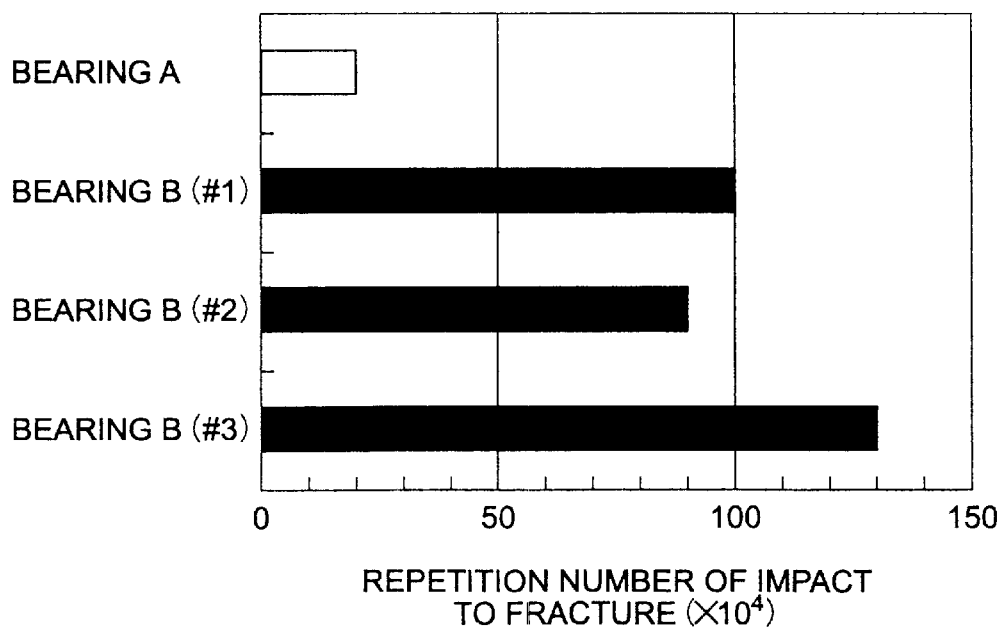
FIG. 16 is a graph showing the result of a drop impact test according to an example.

When a drop impact endurance test for comparing a comb-shaped cage based on the present invention formed in accordance with the first embodiment and a comb-shaped cage of the prior art was conducted, the result shown in FIG. 16 was obtained.

The cages were of a two component type comb-shape. Further, the bearings used for the test were self-aligning roller bearings.

In the bearing A, a cage of the prior art was used in which $(I_1'/I_3')=3.4$. Further, in the bearing B, the cages prepared according to the present invention were used and they were set as: $(I_1'/I_3')=1.1$.

The drop impact endurance test was conducted for examining the endurance of the cage by dropping the bearing together with a bearing box repeatedly and, in the experiment of FIG. 16, the drop height was set for both of the cases of the bearings A and B such that the maximum value of acceleration caused to the bearing box by drop impact was 150 times the acceleration of gravity.

As shown in FIG. 16, the repetitive number of impact till reaching fracture is remarkably greater for all cages according to the present invention assembled in the bearings B compared with that in the bearing A. As described above, it can be seen that the present invention is suitable to the prevention of the fracture of the cage.

EXAMPLE 2

Figure 17:
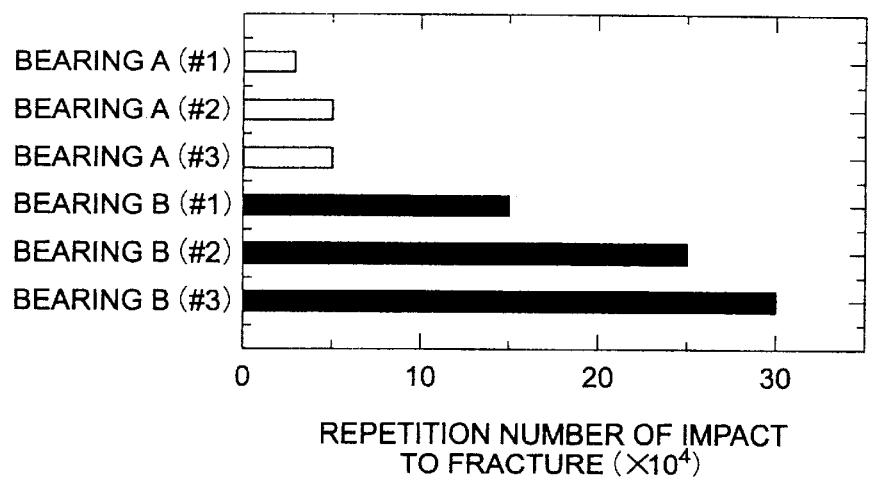
FIG. 17 is a graph showing the result of a comparative endurance test between a cage according to an example of present invention and a cage of the prior art.

Then, when a drop impact endurance test for comparing a comb-shaped cage according to the present invention formed in accordance with the second embodiment and a comb-shaped cage of the prior art was conducted, the result as shown in FIG. 17 was obtained.

The cages were of a one component type comb-shape. Further, the bearings used for the test were self-aligning roller bearings.

In the bearing A, cages of the prior art were used in which $(I_1/I_3)=2.07$. Further, in the bearing B, the cages prepared according to the present invention were used and they were set as: $(I_1/I_3)=1.0$.

The drop impact endurance test was conducted for examining the endurance of the cage by dropping the bearing together with a bearing box repeatedly and, in the experiment of FIG. 17, the drop height was set for both of the cases of the bearings A and B such that the maximum value of acceleration caused to the bearing box by dropping impact was 150 times the acceleration of gravity.

As shown in FIG. 17, the repetitive number of impact till reaching fracture is remarkably greater for all cages according to the present invention assembled in the bearings B compared with that in the bearings A. As described above, it can be seen that the present invention is suitable to the prevention of the fracture of the cage.

Figure 18:
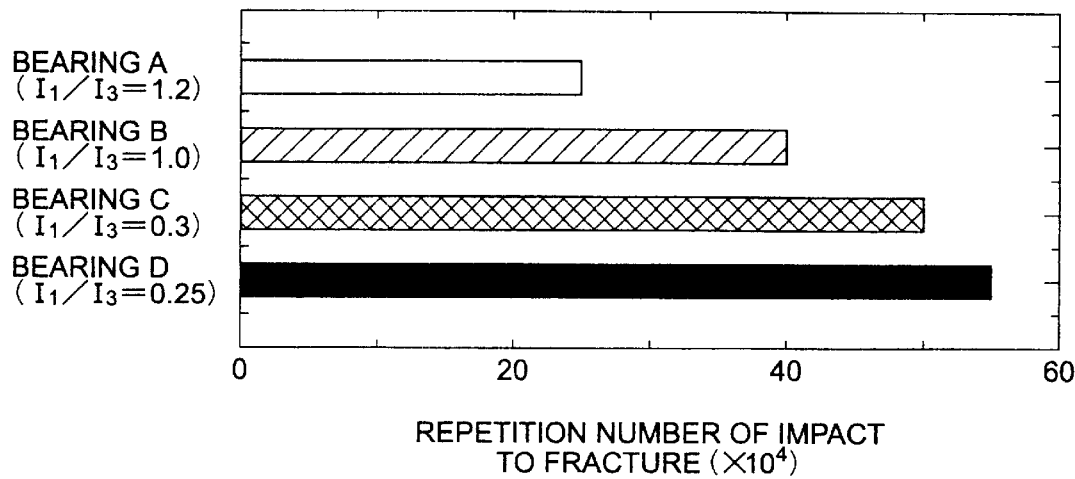
FIG. 18 is a graph showing the result of a drop impact test for the example.

Further, a drop impact endurance test was conducted under the same conditions as described above while changing $(I_1/I_3)$. The result is shown in FIG. 18. The cages were of a two component type comb-shape.

The bearings used for the test were self-aligning roller bearings of the same conditions except for the cages, which were manufactured while changing the value $(I_1/I_3)$ of the cages assembled in the bearings as shown in FIG. 18. The results shown in FIG. 18 are the mean value for the test conducted by three times for each of bearings assembled with the cages having an identical value $(I_1/I_3)$.

In this case, the values $(e_1/e_3)$ and $(d_1/d_3)$ were set such that $(\sigma/\sigma_0)$ takes a minimum value for each $(I_1/I_3)$.

As can be seen from FIG. 18, as the value $(I_1/I_3)$ is smaller, fracture of the cage less occurs.

Figure 11:
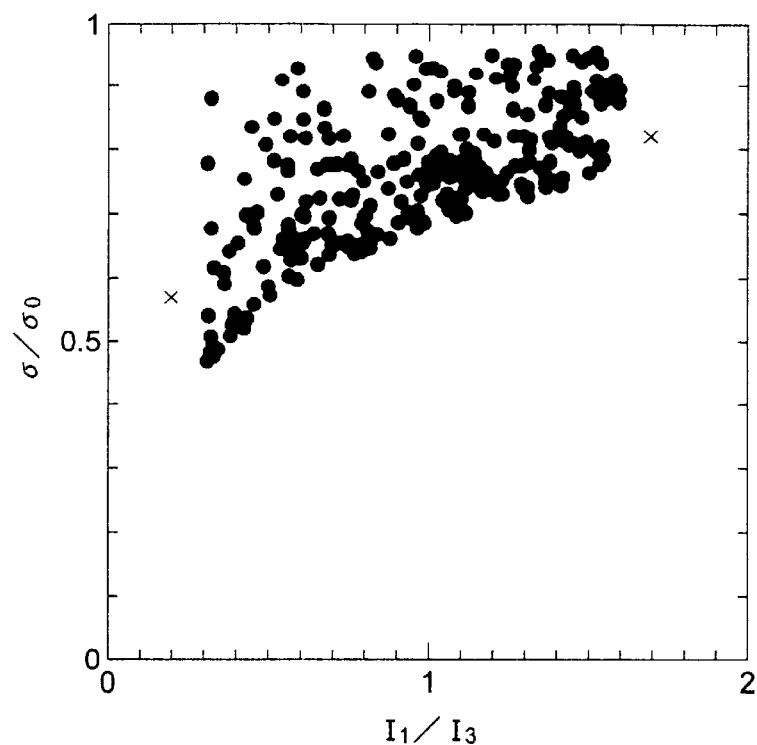
FIG. 11 is a graph showing the result of calculation for the non-dimensional maximum bending stress caused by collision between a roller and a bar portion in a cage for use in a roller bearing according to the present invention.
Figure 12:
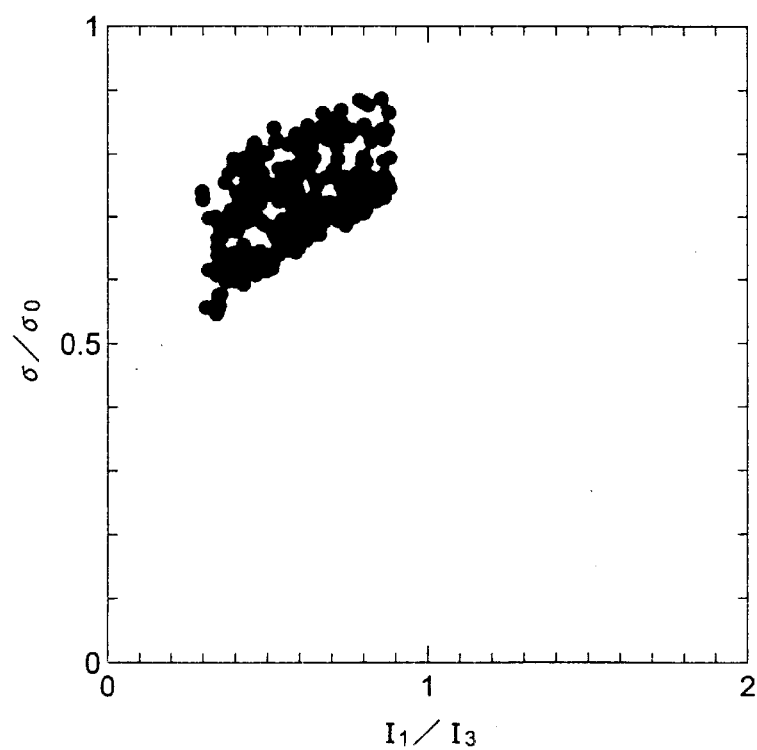
FIG. 12 is a graph showing the result of calculation for the non-dimensional maximum bending stress caused by collision between a roller and a bar portion in a two component type cage for use in a double row cylindrical roller bearing according to the present invention.
Figure 13:
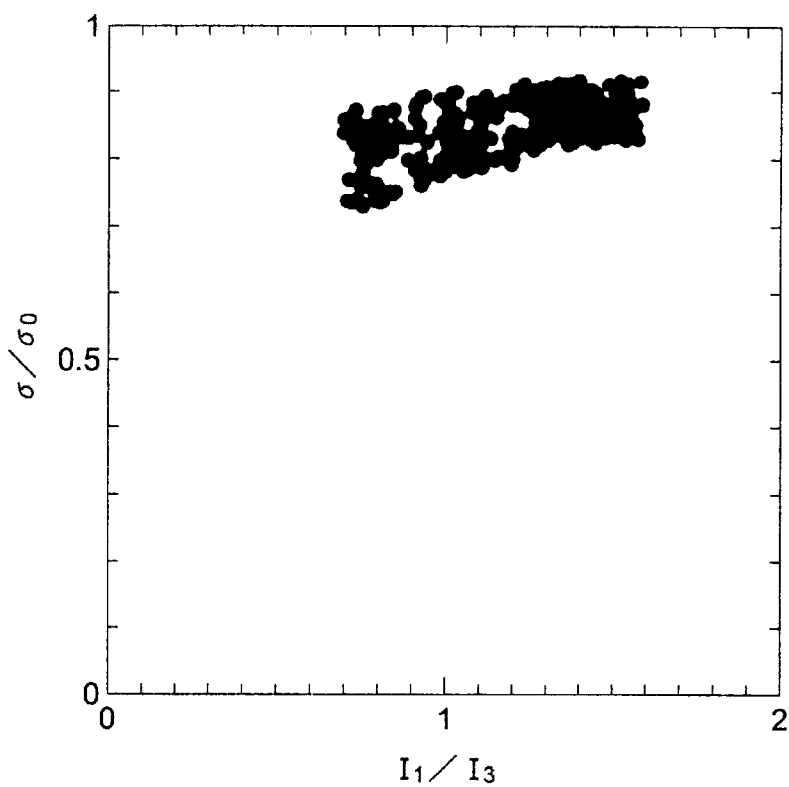
FIG. 13 is a graph showing the result of calculation for the non-dimensional maximum bending stress caused by collision between a roller and a bar portion in a one component type cage for use in a double row cylindrical roller bearing according to the present invention.
Figure 14:
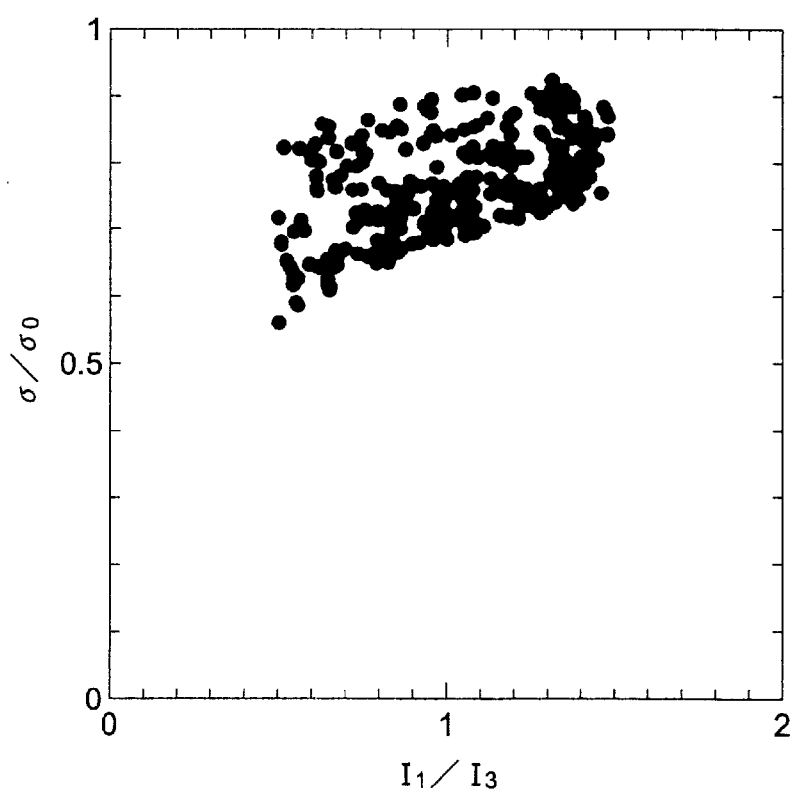
FIG. 14 is a graph showing the result of calculation for the non-dimensional maximum bending stress caused by collision between a roller and a bar portion in a two component type cage for use in a self-aligning roller bearing according to the present invention.
Figure 15:
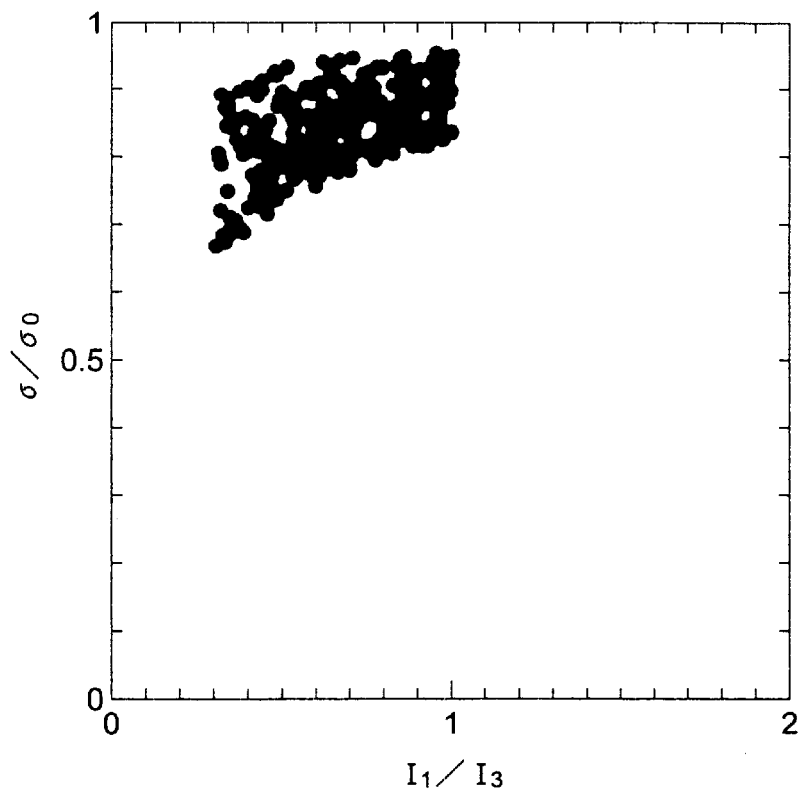
FIG. 15 is a graph showing the result of calculation for the non-dimensional maximum bending stress caused by collision between a roller and a bar portion in a one component type cage for use in a self-aligning roller bearing according to the present invention.

In this case, the bearings D accommodate the cages having the value of $(I_1/I_3)$ beyond the scope of the present invention and it is those indicated by the symbol X in FIG. 11, that is, the cages having defect in view of the dimensional design. That is, they are bearings of lowered load capacity or having defect for the space saving of the bearing in view of the design. That is, if $(I_1/I_3)$ is 0.3 or smaller, it results in: (moment of inertia of area $I_3$ for bar portion)>> (moment of inertia of area $I_1$ for circular portion), which corresponds to setting of the axial width of the circular portion smaller and the circumferential width of the bar portion larger. Then, the diameter of a roller to be held is decreased for assembling rollers of identical number, so the load capacity is reduced compared with bearings A–bearings C. That is, if $(I_1/I_3)$ is decreased excessively, the load capacity of the bearing is lowered, and the size of the bearing itself has to be enlarged to impose a restriction on the design.

On the other hand, as can be seen from FIG. 11 to FIG. 15, as the value $(I_1/I_3)$ is greater, the minimum value $(\sigma/\sigma_0)$ that can be actually adopted is increased to result in an apparent disadvantage and less impact resistance.

Accordingly, it is desirable to keep the value $(I_1/I_3)$ as small as possible depending on the conditions to be used. However, it is necessary to make the value $(I_1/I_3)$ to 0.3 or greater in view of the load capacity and the size enlargement of the bearing required actually as described above.

As has been described above, when the invention is adopted, it can provide effects capable of attaining an optimal design such that the bending stress for the circular portion, and the bending stress for the bar portion are not different greatly from each other, and preventing the fracture of the cage caused by collision between the roller and the bar portion without lowering the load capacity of the bearing.

Particularly, more optimal design is possible as a cage of a two component type for a double row cylindrical roller bearing.

Further, more optimal design is possible as a cage of a one component type for a double row cylindrical roller bearing.

Further, more optimal design is possible as a cage of a two component type for a self-aligning roller bearing.

Further, more optimal design is possible as a cage of a one component type for a self-aligning roller bearing.

What is claimed is:

1. A comb-shaped cage for use in a roller bearing having one circular portion axially opposed to the end surface of each of rollers and a plurality of bar portions protruding from one or both axial sides of the circular portion and arranged circumferentially opposed to the rolling surface of each of the rollers, which satisfies the condition:

$$0.2 \leq (I_1'/I_3') \leq 2.5,$$

wherein $I_1'$ expresses the moment of inertia of area for the circular portion relative to a neutral axis parallel with the longitudinal direction of the bar portion and $I_3'$ expresses the moment of inertia of area for the bar portion relative to a neutral axis parallel with the circumferential direction of the cage.

2. The cage for use in a roller bearing according to the claim 1, wherein the bar portions protrude from only one axial side of the circular portion and the cage is assembled into a double row cylindrical roller bearing, and wherein the condition:

$$0.3 \leq (I_1'/I_3') \leq 1.1$$

is satisfied.

3. The cage for use in a roller bearing according to the claim 1, wherein the bar portions protrude from both axial sides of the circular portion and the cage is assembled into a double row cylindrical roller bearing, and wherein the condition:

$$0.3 \leq (I_1'/I_3') \leq 0.9$$

is satisfied.

4. The cage for use in a roller bearing according to the claim 1, wherein the bar portions protrude from only one axial side of the circular portion and the cage is assembled into a self-aligning roller bearing, and wherein the condition:

$$0.3 \leq (I_1'/I_3') \leq 2.5$$

is satisfied.

5. The cage for use in a roller bearing according to the claim 1, wherein the bar portions protrude from both axial sides of the circular portion and the cage is assembled into a self-aligning roller bearing, and wherein the condition:

$$0.2 \leq (I_1'/I_3') \leq 1.0$$

is satisfied.

6. The cage for use in a roller bearing according to claim 1, which satisfies the condition:

$$0.3 \leq (I_1/I_3) \leq 1.5,$$

wherein $I_1$ expresses the moment of inertia of area for the circular portion relative to a neutral axis vertical to the longitudinal direction of the bar portion is $I_3$ expresses the moment of inertia of area for the bar portion relative to a neutral axis vertical to the circumferential direction of the cage.

7. The cage for use in a roller bearing according to any one of claims 1 to 5, which satisfies the condition:

$$0.3 \leq (I_1/I_3) \leq 1.6,$$

wherein $I_1$ expresses the moment of inertia of area for the circular portion relative to a neutral axis vertical to the longitudinal direction of the bar portion and $I_3$ expresses the moment of inertia of area for the bar portion relative to a neutral axis vertical to the circumferential direction of the cage.

8. The cage for use in a roller bearing according to claim 2, which satisfies the condition:

$$0.3 \leq (I_1/I_3) \leq 0.9$$

wherein $I_1$ expresses the moment of inertia of area for the circular portion relative to a neutral axis vertical to the longitudinal direction of the bar portion and $I_3$ expresses the moment of inertia of area for the bar portion relative to a neutral axis vertical to the circumferential direction of the cage.

9. The cage for use in a roller bearing according to claim 3, which satisfies the condition:

$$0.7 \leq (I_1/I_3) \leq 1.6$$

wherein $I_1$ expresses the moment of inertia of area for the circular portion relative to a neutral axis vertical to the longitudinal direction of the bar portion and $I_3$ expresses the moment of inertia of area for the bar portion relative to a neutral axis vertical to the circumferential direction of the cage.

10. The cage for use in a roller bearing according to claim 4, which satisfies the condition:

$$0.5 \leq (I_1/I_3) \leq 1.5$$

wherein $I_1$ expresses the moment of inertia of area for the circular portion relative to a neutral axis vertical to the longitudinal direction of the bar portion and $I_3$ expresses the moment of inertia of area for the bar portion relative to a neutral axis vertical to the circumferential direction of the cage.

11. The cage for use in a rolling bearing according to claim 5, which satisfies the condition:

$$0.3 \leq (I_1/I_3) \leq 1.0$$

wherein $I_1$ expresses the moment of inertia of area for the circular portion relative to a neutral axis vertical to the longitudinal direction of the bar portion and $I_3$ expresses the moment of inertia of area for the bar portion relative to a neutral axis vertical to the circumferential direction of the cage.

12. A comb-shaped cage for use in a roller bearing having one circular portion axially opposed to the end surface of each of rollers and a plurality of bar portions protruding from one or both axial sides of the circular portion and arranged circumferentially opposed to the rolling surface of each of the rollers, which satisfies the condition:

$$0.3 \leq (I_1/I_3) \leq 1.6,$$

wherein $I_1$ expresses the moment of inertia of area for the circular portion relative to a neutral axis vertical to the longitudinal direction of the bar portion and $I_3$ expresses the moment of inertia of area for the bar portion relative to a neutral axis vertical to the circumferential direction of the cage.

13. The cage for use in a roller bearing according to the claim 12, wherein the bar portions protrude from only one axial side of the circular portion and the cage is assembled into a double row cylindrical roller bearing, and wherein the condition:

$$0.3 \leq (I_1/I_3) \leq 0.9$$

is satisfied.

14. The cage for use in a roller bearing according to the claim 12, wherein the bar portions protrude from both axial sides of the circular portion and the cage is assembled into a double row cylindrical roller bearing, and wherein the condition:

$$0.7 \leq (I_1/I_3) \leq 1.6$$

is satisfied.

15. The cage for use in a roller bearing according to the claim 12, wherein the bar portions protrude from only one axial side of the circular portion and the cage is assembled into a self-aligning roller bearing, and wherein the condition:

$$0.5 \leq (I_1/I_3) \leq 1.5$$

is satisfied.

16. The cage for use in a roller bearing according to the claim 12, wherein the bar portions protrude from both axial sides of the circular portion and the cage is assembled into a self-aligning roller bearing, and wherein the condition:

$$0.3 \leq (I_1/I_3) \leq 1.0$$

is satisfied.

17. A comb-shaped cage for use in a roller bearing having one circular portion axially opposed to the end surface of each of rollers and a plurality of bar portions protruding from one axial side of the circular portion and arranged circumferentially opposed to the rolling surface of each of the rollers, which satisfies the condition:

$$0.3 \leq (I_1/I_3) \leq 1.5,$$

wherein $I_1$ expresses the moment of inertia of area for the circular portion relative to a neutral axis parallel with the longitudinal direction of the bar portion and $I_3$ expresses the moment of inertia of area for the bar portion relative to a neutral axis vertical to the circumferential direction of the cage.

18. A comb-shaped cage for use in a roller bearing having one circular portion axially opposed to the end surface of each of rollers and a plurality of bar portions protruding from one axial side of the circular portion and arranged circumferentially opposed to the rolling surface of each of the rollers, which satisfies the condition:

$$0.3 \leq (I_1'/I_3') \leq 2.5,$$

wherein $I_1'$ expresses the moment of inertia of area for the circular portion relative to a neutral axis parallel with the longitudinal direction of the bar portion and $I_3'$ expresses the moment of inertia of area for the bar portion relative to a neutral axis parallel with the circumferential direction of the cage.

* * * * *